United States Patent Office 2,959,568
Patented Nov. 8, 1960

2,959,568

THERMAL STABILIZATION OF HALOETHYLENE POLYMERS

Carl B. Havens, Hope, Mich., assignor to The Dow Chemical Company, Midland, Mich., a corporation of Delaware No Drawing. Filed Oct. 22, 1956, Ser. No. 617,263

6 Claims. (Cl. 260—45.75)

This invention relates to the thermal stabilization of haloethylene polymers. More particularly it relates to new compositions based on haloethylene polymers having improved thermal stability over the prior known compositions.

It is known that haloethylene polymers, such as polyvinyl chloride and the copolymers of vinyl chloride and vinylidene chloride, undergo appreciable degradation and darkening when heated during thermal fabrication operations and when the fabricated articles are exposed for prolonged periods to elevated temperatures. Such thermal sensitivity has seriously limited the applications in which haloethylene polymers may be employed. One of the common means for alleviating that degradation has been to employ certain additives as heat stabilizers in the polymer formulations. However, the requirements of a suitable heat stabilizer are manifold and varied. It must be compatible with and inert to all elements of the formulation. It must be odor-free and not impart a color to the formulation. It is desirable that it be non-toxic and tasteless. None of the prior heat stabilizers have successfully met all of the above requirements in addition to the primary duty of stabilizing the composition to thermal degradation. In addition, because of the many requirements for heat stabilizers, it is impossible for an investigator to predict the effectiveness of a particular compound as a stabilizer with any degree of certainty, and continuous search is being made for new and more effective stabilizers.

It is accordingly an object of this invention to provide a novel heat stabilized composition based upon haloethylene polymers.

The above and related objects are accomplished with a composition comprising a haloethylene polymer and stabilizing amounts of an inorganic salt of phenylphosphonic acid. Compositions thus prepared show outstanding stability to the degradative effects of elevated temperatures.

It has been found that the sodium, lithium, potassium, barium, and lead salts of phenyl phosphonic acid are unusually effective stabilizing materials, and these are preferred in the compositions of this invention. It is well-known that certain metals, such as iron, zinc, and copper, have a deleterious effect on haloethylene polymers and the salts of those metals are to be avoided.

The salts are easily prepared from readily available materials. The sodium, lithium, and potassium salts are prepared by stirring the corresponding hydroxide into an aqueous solution of phenyl phosphonic acid followed by isolation of the salt by evaporation, distillation, or other known solvent removal technique. The barium and lead salts are prepared by stirring the corresponding chloride into a hot aqueous solution of the sodium salt of the acid. The latter salts are isolated by cooling the solution to room temperature causing crystallization and may be purified by recrystallization from aqueous solution. The salts are white or very slightly colored.

The salts of this invention show stabilizing effectiveness when used in an amount of from 0.1 to 5 percent, preferably 0.25 to 2.5 percent, by weight based on the weight of the polymer. When more than 5 percent is used, the stabilizers become economically unattractive, no additional benefits accrue, and the physical properties of articles made from the composition suffer.

These salts are white and odorless so that white or pastel-colored articles may be prepared without their appearance being affected by the stabilizer. Articles prepared from such compositions are more merchantable than those prepared from many of the known compositions due to their absence of odor. Additionally these salts show greater stabilizing effectiveness toward compositions based upon haloethylene polymers than any previously known thermal stabilizer.

The stabilizers of this invention may be employed with the other common additives used in haloethylene polymer formulations without any adverse effects resulting therefrom. Typical of such additives are light stabilizers, fillers, pigments, and dyes.

These stabilizers may be incorporated into the polymer formulations by any known blending technique, such as milling and dry blending. It is preferred that the salt be in a finely comminuted state for blending purposes to achieve uniform dispersion of the salt through the formulation more easily.

By way of example, several sample compositions were prepared by ball-milling 89 parts by weight of a copolymer prepared from 85 percent by weight of vinylidene chloride and 15 parts by weight of vinyl chloride, 6 parts by weight of tributyl aconitate as a plasticizer, and 2 parts by weight of phenyl salicylate as a light stabilizer. One of the compositions was left unstabilized to heat for comparative purposes. To each of the others was added 3 parts by weight of a salt of this invention. The samples were evaluated according to a standard test. In that test a sample of at least 20 grams of the composition is subjected to a temperature of 178° C. and the pressure of the evolved hydrohalide gas used to determine the degree of thermal degration. The results are relative to a standand and are reported as "T" values, which are the times in minutes required for the samples to reach an arbitrary rate of pressure rise. Thus, a more thermally stable composition will have a higher "T" value than a less stable composition. The results are listed in the following table.

| Stabilizer | "T" Value |
| --- | --- |
| None | 8 |
| Sodium phenylphosphonate | 21 |
| Barium phenylphosphonate | 23 |
| Lead phenylphosphonate | 17 |

To further evaluate the stability of the above compositions, each was molded into a specimen having a thickness of 0.10 inch. The original color in each case was light tan. The specimens were exposed to direct weathering in the State of Michigan at 44° north for three months. At the end of that exposure the specimens were examined for color change. The unstabilized composition had turned light brown and the three stabilized compositions showed no change in color.

Similar results are observed when the listed salts are employed as stabilizers in compositions based on the polymer of vinyl chloride or other defined haloethylene polymer. In addition the same results are observed with the sodium salt are attained when using the lithium and potassium salts.

I claim:

1. A thermally stable composition comprising a resinous chloroethylene polymer selected from the class consisting of the homopolymer of vinyl chloride, the homopolymer of vinylidene chloride, the copolymers of vinyl chloride with another monoethylenically unsaturated comonomer and the copolymers of vinylidene chloride with another monoethylenically unsaturated comonomer and stabilizing amounts of an inorganic salt selected from the group consisting of the sodium, lithium, potassium, barium and lead salts of phenyl phosphonic acid.

2. The composition claimed in claim 1 wherein said inorganic salt is present in an amount of from 0.1 to 5 percent by weight of said chloroethylene polymer.

3. The composition claimed in claim 1 wherein said chloroethylene polymer is a copolymer composed predominantly of vinylidene chloride with a complementary amount of a monoethylenically unsaturated comonomer.

4. The composition claimed in claim 1 wherein said inorganic salt is sodium phenyl phosphonate.

5. The composition claimed in claim 1 wherein said inorganic salt is barium phenylphosphonate.

6. The composition claimed in claim 1 wherein said inorganic salt is lead phenylphosphonate.

References Cited in the file of this patent

UNITED STATES PATENTS 2,739,952  Linville _____ Mar. 27, 1956
2,784,171  Chadwick _____ Mar. 5, 1957